Feb. 26, 1957 J. J. VANDERHOOFT 2,783,406

STEREOSCOPIC TELEVISION MEANS

Filed Feb. 9, 1954

INVENTOR.
JOHN J. VANDERHOOFT
BY

United States Patent Office 2,783,406

Patented Feb. 26, 1957

2,783,406

STEREOSCOPIC TELEVISION MEANS

John J. Vanderhooft, Jamaica, N. Y.

Application February 9, 1954, Serial No. 409,037

4 Claims. (Cl. 313—70)

This invention relates to stereoscopic television means and more particularly to such means using a double gun cathode ray tube.

This application is a continuation in part of my co-pending application S. N. 284,970 filed April 29, 1952, entitled Telecasting and Projecting Stereoscopic Pictures.

My prior application describes stereoscopic television means including a receiving picture tube having a viewing screen. A second screen placed in front of said viewing screen and having alternate transparent and opaque lines and a lenticulated or ribbed screen placed in front of the vibrating screen. In operation, the left and right pictures are interlaced so that the vibrating comb screen alternately uncovers the left and then the right picture. The left and right pictures are separately transmitted to the eyes of the viewer by means of the lenticulated lens screen in well known fashion. The use of lenticulated screens is quite old. It is designed so that the spacing between the viewer's eyes causes his left eye and his right eye to focus on alternate lines of the viewing screen.

The improvement of the present invention eliminates the vibrating comb screen thereby removing the difficulty of vibrating the screen in the proper manner for perfect viewing, and permits the right and left images to be transmitted simultaneously.

In the present invention, a double gun cathode ray tube is used and a stationary comb is provided which is so related in space to the sources of electrons and to the viewing screen so that alternate bands of the viewing screen receive signals from the left and right respectively. The viewer's left and right eyes receive the left and right pictures separately due to a lenticulated screen in conventional manner as described in my prior application.

Accordingly, a principal object of the invention is to provide new and improved stereoscopic television means.

Another object of the present invention is to provide new and improved stereoscopic television receiving means utilizing a double gun cathode ray tube.

Another object of the present invention is to provide new and improved stereoscopic television receiving means utilizing a double gun cathode ray tube and a stationary comb mask placed between the double gun and screen of the cathode ray tube.

Another object of the present invention is to provide new and improved stereoscopic television receiver without any mechanically moving parts.

These and other objects of the invention will be apparent from the following specification and drawings of which:

Figures 1, 2:
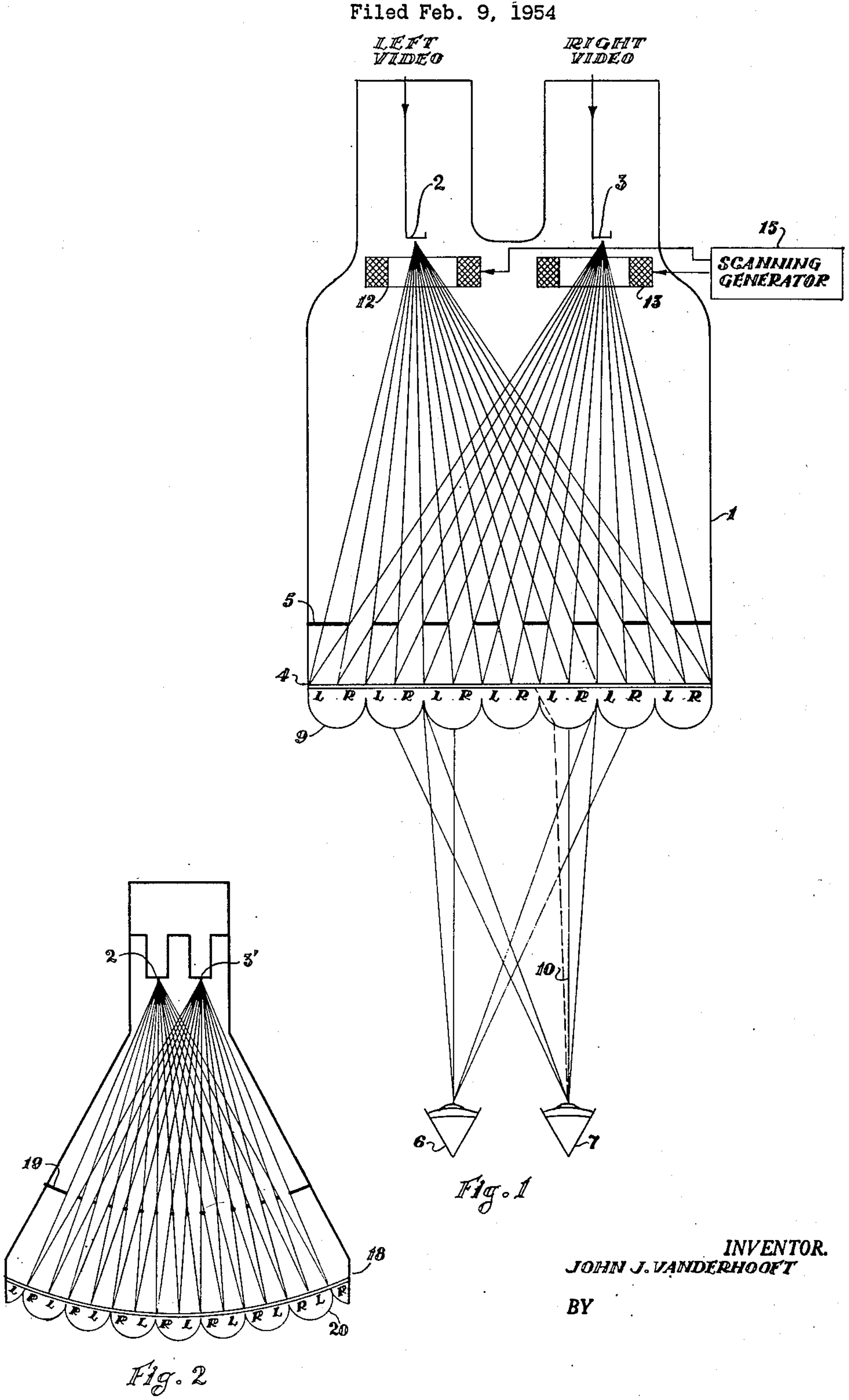
Figure 1 is a plan view of an embodiment of the invention.
Figure 2 is a plan view of another embodiment of the invention.

Referring to Figure 1, there is shown a cathode ray tube 1 having right and left electronic guns 2 and 3. The electronic guns are adapted to focus electronic beams on the viewing screen 4 in conventional manner by means of focusing coils 12 and 13. The focusing and scanning apparatus 15 is entirely conventional.

Located adjacent the viewing screen on the side toward the electronic gun is a mask 5 consisting of a plate having equal bars and slots, which may be called a comb mask, or grating.

The transmitting apparatus is not shown and may be conventional. Left and right cameras would be used, and the left and right video fed to the left and right electron guns. The interlaced scanning is provided by scanning generator 15.

The comb mask or grating 5 is so spaced between the viewing screen and the electron guns so that alternate lines on the viewing screen 4 are from the separate cathode ray guns. In other words, the left line and right line, etc. as illustrated.

The stereoscopic pictures will be taken by separate, displaced cameras in conventional manner and the video signals from the left camera will be applied to the left gun 3 and those taken by the right camera will be applied to the right gun 2. Therefore, the left and right pictures will be interlaced on the screen as illustrated in Figure 1 and the comb mask is located and arranged to provide this effect.

The left and right interlaced pictorial representations are separately presented to the left and right eyes 6 and 7 of the viewer by means of the lenticulated screen 9. For instance, the light rays 10 from the screen to the right eye are focused on a right picture line on the viewing screen 4 as shown. If the operator views along the line 10′ the light ray will be bent as illustrated into the adjacent right hand section due to the curvature at the point 12 of the lenticulated screen. The same thing happens to the left eye of the observer. This property of a lenticulated screen is well known. The ribs of lenticulated screen 9 each cover a left and a right scanning line as shown. If the picture had 525 lines, there would be half that many ribs. Only a few ribs are shown in order to illustrate the operation.

Figure 2 shows another embodiment of the invention wherein the viewing screen 18 has a definite curvature and the mask 19 and lenticular screen 20 have similar curvature. Otherwise, the structure and operation of the embodiment of the Figure 2 is the same as that of Figure 1.

The invention is not limited to television, but applies equally to stereoscopic projection from left and right projectors located behind a viewing screen. The mask and lenticulated lens would operate in the same manner.

I claim:

1. Stereoscopic television receiving means comprising a cathode ray tube having two electron guns, said cathode ray tube having a viewing screen, a mask having alternate bars and slots placed between said viewing screen and said electron guns thereby providing on the screen a pictorial representation of interlaced signals from the left and right guns respectively and a lenticulated lens placed in front of said viewing screen whereby said interlaced left and right representations are separately transmitted to the left and right eyes of the viewer, to provide a stereoscopic representation.

2. Stereoscopic television receiving means comprising a cathode ray tube having two electron guns adapted to receive signals representing left and right views, said cathode ray tube having a viewing screen, a mask grating having alternate bars and slots placed between said viewing screen and said electron guns thereby providing on the screen a pictorial representation of interlaced signals from the left and right guns respectively and a lenticulated lens placed in front of said viewing screen whereby said interlaced left and right representations are separately transmitted to the left and right eyes of the viewer.

3. Stereoscopic television receiving means comprising a cathode ray tube having two electron guns, said cathode ray tube having a viewing screen, a grating having alternate bars and slots placed between said viewing screen and said electron guns to provide on the screen pictorial representations of signals from the left and right guns respectively and means placed in front of said viewing screen whereby said left and right representations are separately transmitted to the left and right eyes of the viewer.

4. Television means comprising a cathode ray tube having at least two electron guns, said cathode ray tube having a viewing screen, a mask having alternate bars and slots placed between said viewing screen and said electron guns thereby providing on the screen pictorial representations of signals from the left and right guns respectively and a lenticulated lens placed in front of said viewing screen whereby said interlaced left and right representations are separately transmitted to the left and right eyes of the viewer, said lenticulated lens ribs each covering a left and a right scanning line.

References Cited in the file of this patent

UNITED STATES PATENTS

| | | |
|---|---|---|
| 2,091,152 | Malpica | Aug. 24, 1937 |
| 2,107,464 | Zworykin | Feb. 8, 1938 |
| 2,301,254 | Carnahan | Nov. 10, 1942 |
| 2,307,188 | Bedford | Jan. 5, 1942 |
| 2,479,820 | De Vore | Aug. 23, 1949 |

FOREIGN PATENTS

| | | |
|---|---|---|
| 497,691 | Great Britain | Dec. 23, 1938 |
| 866,065 | France | May 31, 1941 |